Jan. 5, 1960    F. C. KOCH    2,919,559
COOLING SYSTEM
Filed Sept. 20, 1956
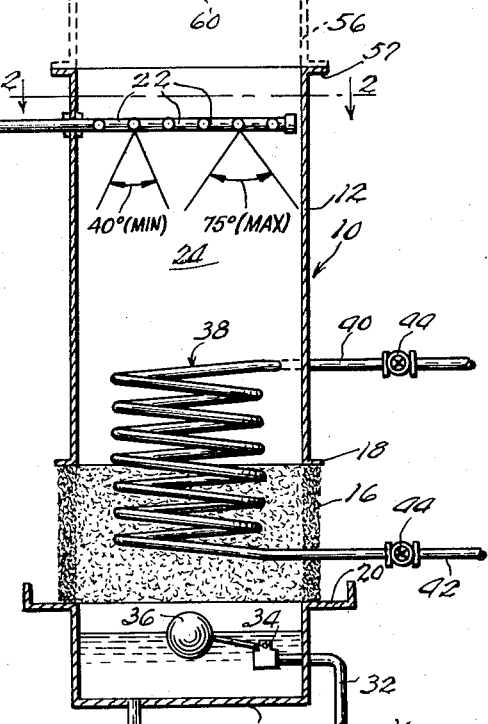
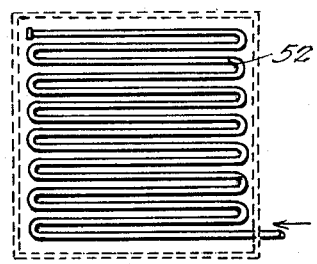
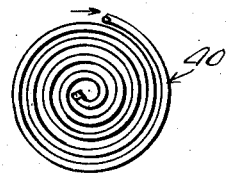
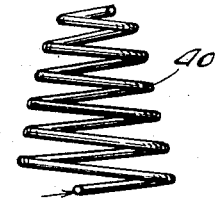
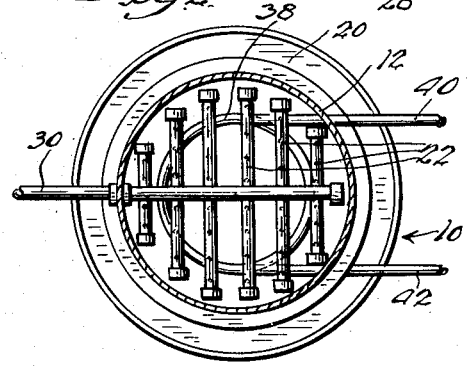
INVENTOR.
Fred C. Koch.

United States Patent Office 2,919,559
Patented Jan. 5, 1960

2,919,559
COOLING SYSTEM

Fred C. Koch, Wichita, Kans., assignor to Koch Engineering Company, Inc., Wichita, Kans., a corporation of Kansas Application September 20, 1956, Serial No. 610,968

6 Claims. (Cl. 62—305)

This invention relates to an improved cooling system which is particularly adapted for use in conjunction with home air-conditioning units and similar type refrigeration units and is a continuation in part of my copending application Serial No. 544,283, filed November 1, 1955.

In the latter copending application a cooling tower of novel design was described and illustrated for use in conjunction with a heat exchanger whereby warm refrigerant utilized in a home air-conditioning or similar cooling system was cooled. In accordance with the invention hereinafter to be disclosed, the cooling tower previously described in my copending application will be utilized so as to effect direct, more efficient cooling of warm refrigerant utilized in the above mentioned systems.

It is an object, therefore, of this invention to provide a cooling system particularly adapted for use in conjunction with the air-conditioning of homes which insures optimum cooling efficiency.

It is a further object of this invention to provide a cooling system which is extremely simple in details of construction and inexpensive to manufacture and operate.

It is a still further object of this invention to provide a cooling system for home air-conditioning plants or the like in which the capacity may be increased and finely regulated by utilization of mechanical means if so desired.

The above and other objects of this invention will become more apparent from the following description, accompanying drawing and appended claims.

In one embodiment of the cooling system to be disclosed, a tower or enclosure similar to that described in my copending application filed November 1, 1955, is utilized. The latter tower comprises an enclosure having an upper end limit open to the atmosphere. A plurality of sprays in communication with a source of water, which is to be sprayed down into the tower and cooled, is disposed across a cross-sectional area of the enclosure or tower adjacent the open end thereof. The sprayed water in the course of descending creates a downward draft, which pulls in air through the tower open end, and concomitantly rapidly cools the sprayed water as a result of the evaporation taking place. Disposed about the tower adjacent the lower end limit thereof and forming a peripheral portion thereof is a water-de-entraining section which, although enabling air readily to flow therethrough, filters out water, forcing it to remain in the tower and flow into an underlying basin for collection. The cooled water in the basin is continuously recycled to the overlying spray means for continuation of the cooling operation in the normal course of operation.

Disposed in the empty tower or enclosure between the overlying sprays and the underlying basin is a coil member through which warm refrigerant used in a home air-conditioning system or similar installation flows. The refrigerant is obviously cooled in the course of its passage through the coil disposed in the tower. Being disposed between the sprays and the basin, the refrigerant coil is in the path of the sprayed water being cooled. In addition, the wet coils are also in the direct path of the air currents flowing through the tower from the open end through the de-entraining section. The combination of the air movement and water evaporation on the coil surface enables efficient cooling of the warm refrigerant contained in the coil to be effected.

In a modified cooling system a coil member, through which warm refrigerant flows, may be disposed completely in the basin portion of the tower and is submerged in the sprayed liquid which has collected therein, as will hereinafter be explained in greater detail.

If greater cooling effect is desired in either of the above described systems, a mechanical means such as a fan may be disposed adjacent the entrance to the tower whereby air will be forced to enter the same and flow downwardly in greater volume than when the sprays alone are utilized for purposes of creating a draft in the tower.

For a more complete understanding of this invention, reference should now be had to the drawings, wherein:

Figure 1 is a vertical sectional view of a cooling system constructed in accordance with the principles of this invention;

Fig. 2 is a sectional view taken on line 2—2 of Fig. 1;

Fig. 3 is a plan view of a modified form of cooling coil;

Fig. 4 is a side elevational view of the cooling coil of Fig. 3;

Fig. 5 is a plan view of a second modified form of cooling coil, and

Fig. 6 is a fragmentary, vertical, sectional view of a modified cooling system.

Referring now more patricularly to Fig. 1, a cooling tower 10 is illustrated comprising an upper shell or enclosure portion 12 which is disposed above a bottom portion 14 which functions as a basin or reservoir for the recirculating water which effects the cooling in the system. Disposed between the latter two tower portions is a peripheral water-de-entraining section 16 which abuts at opposed end limits against a flange 18, defining the lower end limit of the upper tower portion 12, and the upper end limit of the basin portion 14 of the tower. It will be noted that the latter upper end limit of the basin is formed so as to define a trough 20 for purposes of collecting any condensate which may form on the de-entraining section in the cooling process, which will hereinafter be described.

The water-de-entraining section 16, which is disposed about the entire circumference of the tower and forms a portion thereof, is readily air permeable but prevents the escape of fine water spray to the exterior of the tower. Consequently, water loss is reduced to a minimum. The de-entraining section comprises a material of low strength such as glass wool, and obviously re-enforcing means such as steel rods must be maintained between the flange portion 18 and the trough portion 20 of the tower.

Disposed across the tower cross section adjacent the upper end limit thereof is a plurality of spray members 22, more clearly seen in Fig. 2. The latter spray members comprise the means whereby the water to be cooled is atomized or broken into fine particles for purposes of contacting the air and becoming cooled by the same as a result of evaporation. It is, of course, apparent that to enable the latter cooling to take place, the air with which the sprayed liquid comes in contact must have a wet bulb temperature which is lower than the temperature of the liquid; the greater the temperature differential the greater the cooling effect. In addition, if the unsaturated air with which the sprayed water comes in contact has a lower temperature than the water, the water is also cooled by the transfer of sensible heat to the air.

The water which is to be cooled, and in turn cool warm refrigerant, emerges from the sprays 22 and is broken up into fine particles. The liquid is immediately cooled by evaporation as a result of contact with the air which is continually drawn into the open end of the tower as a result of the draft created by the sprayed water. The downward descent of the sprayed water is sufficient in itself to induce a draft which adequately cools the warm water sprayed through the members 22; no fan or equivalent means is needed. The savings to be realized from such a system in which the need for fan or other mechanical means is dispensed with are believed apparent.

It has been found that the included angle of the water spray emerging from each nozzle or opening in the sprays 22 is of great importance. If the angle is too wide the spray will not entrain sufficient air for cooling purposes. The cooling capacity of the tower will then be substantially less than if water sprays of proper included angle are produced by the spray openings or nozzle members. The preferred included angle of the water sprays emerging from the spray nozzles is approximately between 40–50 degrees; the included angle should preferably not exceed approximately 75 degrees.

It is apparent from Fig. 1 that the interior chamber 24 of the tower 10 is void of any packing commonly used in towers of this type, thereby enabling the air to rapidly flow from the inlet through the water-de-entraining section 16 and thence to the exterior of the tower. The water being sprayed, of course, descends to the underlying basin 14, where it is collected, enters conduit 26, and is forced by pump member 28 through conduit 30 to once again be sprayed through the spray members 22. To make up for any water loss which may occur in the normal course from the water cooling operation, an inlet pipe 32 is in communication with the basin chamber and has a valved end limit 34 which is regulated by a float member 36. If the level in the basin drops below a certain minimum the float-controlled valve 34 will open, allowing water from a source (not shown) to enter the basin by means of the conduit 32.

As previously mentioned, it is an object of this invention to provide an efficient system for cooling the refrigerant utilized in small cooling installations such as a home air-conditioning plant. Although the latter use is a system with which the illustrated apparatus could obviously be employed, it should be understood that this invention is not limited thereto. Disposed in the tower chamber 24 adjacent the water-de-entraining section 16 is a coil 38 which communicates with apparatus not shown, employed in an air-conditioning unit or other device utilizing a circulating refrigerant. The upper and lower end limits of the coil 38 are formed integrally with inlet and outlet conduits 40 and 42, each of which is valved. Valve members 44 disposed in each conduit enable the rate of refrigerant flow to be regulated.

The manner in which the circulating refrigerant passing through the coil 38 is cooled is believed apparent. The spraying water emerging from the sprays 22 pulls in air, creating a draft in the tower chamber 24, and concomitantly is cooled in the course of its downward passage. The coil member 38 is in the direct path of the spraying water and is wetted thereby. The continual flow of air through the tower of the de-entraining section 16 evaporates the water film on the surface of the coil 38. Consequently the warm refrigerant entering the coil 38 through the inlet 40 is continuously being cooled in the course of its passage through the convolutions of the coil 38. Upon emerging from the tower chamber 24 through the coil outlet 42 the refrigerant will be at a lower temperature, having lost a portion of its heat content to the water and air flowing in the tower, and is once again ready for use in a refrigeration system (not shown).

The specific configuration of the coil member employed in the cooling tower chamber 24 is not critical. It is obvious, however, that the coil should be designed so as to give maximum cooling efficiency. It may be desirable, for instance, to employ a coil having a slightly conical configuration, such as is illustrated in Figs. 3 and 4. Such a coil 40, by virtue of its conical configuration, enables the downwardly spraying water to directly contact substantially the entire surface area thereof during the spraying operation. It will be noted in Fig. 1 that the convolutions of the uniformly cylindrical coil 38 are disposed in substantially vertical alignment whereby the lower coils may be prevented from contacting the spraying water directly by means of the overlying convolutions.

A second modified coil which may be employed is illustrated in Fig. 5. Such a coil would be utilized with a tower having a square or other rectilinear cross-sectional configuration. Despite the coil configuration utilized it is apparent that they should all preferably be disposed as far as possible from the sprays 22. By virtue of the latter disposition, the downwardly flowing water emerging through the sprays will contact the coil surface only after traversing a maximum tower distance in the course of which it is continually being cooled. In addition, all coils should preferably be composed of thin gauge materials having high thermal conductivity.

Referring to Fig. 6, a modified coil-cooling tower arrangement is illustrated in which a coil 38a through which warm refrigerant flows is disposed in a basin portion 14a of a tower 10a which is fragmentarily shown. The tower 10a of Fig. 6 is precisely the same as that illustrated in Fig. 1, with the exception that the basin portion 14a thereof may have a greater height to enable coil 38a to be completely submerged in the cool water which has collected in the basin. The coil 38a, similarly to coil 38 of Fig. 1, is in communication with a system (not shown) utilizing refrigerant. Employing the coil disposition of Fig. 6 in a cooling tower, there is no obstruction to oppose the flow of air from the tower open end through a de-entraining peripheral portion 16a. The resistance offered to the air flow in tower 10a is thus less than that present in the tower 10 of Figs. 1 and 2. In both of the illustrated systems the warm refrigerant coils are contacted by the cooling water when the latter water has its greatest cooling capacity.

In some instances fine regulation of the cooling tower or an increase of the tower capacity may be desired. Such regulation and increase may be effected by an assembly comprising an annular tower member 56 disclosed in Fig. 1 in dotted lines which is mounted atop the upper flanged end limit 57 of the upper tower portion 12. Supported by the upper end limit of the annular tower section 56 is a platform member 58 on which is disposed a fan member 60 driven by a motor member 62. This assembly performs the function of mechanically forcing air into the open end of the tower 10. Obviously by utilizing a fan the speed of which may be controlled, another direct control is had over the cooling capacity of the tower. The fan 60 and related parts may also, of course, be used in conjunction with tower 10a, fragmentarily shown in Fig. 6.

It is believed apparent from the foregoing that cooling systems have been provided which, although simple in details of design, possess unusual efficiency which is unknown in the art. The tower constructions provided possess no packing or other water distributing means, enabling the cooling air and water to flow therethrough with a minimum of resistance. As a result of the latter flow, tower efficiency is greatly increased. The illustrated systems require no mechanical means to assist the flow of air. As above explained, cooling efficiency resulting from the direct contact between the coil member containing the warm refrigerant and the cooling air and water is a notable advance in the art.

Certain modifications of the specific embodiments shown may be made without departing from the spirit and scope of this invention. For instance, other materials may be substituted for the glass wool utilized in the tower de-entraining sections. Also, as above mentioned, the specific coil configuration is immaterial. This invention is to be limited, therefore, only by the scope of the appended claims.

I claim:

1. In a combination for cooling liquids, a hollow enclosure having an upper end section in communication with the surrounding atmosphere, a liquid de-entraining, air-permeable section defining a lower peripheral wall portion of said enclosure and comprising a uniform continuation of said upper end section, spray means disposed in said upper end section for spraying liquids in the direction of said air-permeable section, said liquids being broken into fine particles in the normal spraying operation, said spray means action inducing air to enter said enclosure upper end section, flow downwardly into said enclosure and out said air-permeable section, the distance between said spray means and said air-permeable section being sufficient to enable said liquid particles to partially evaporate because of contact with said air induced to enter said enclosure, whereby the temperature thereof is lowered, and fluid conduit means disposed in said enclosure in the path of said fluid particles, said conduit means being spaced a sufficient distance from said spray means whereby the temperature of said liquid particles is lower upon contacting said conduit means than the temperature at which emitted from said spray means.

2. The combination as recited in claim 1, in which said conduit means is composed of material having high thermal conductivity and is in a form presenting a large exposed surface area for contacting said liquid particles.

3. In a combination for cooling fluids, a hollow enclosure having an upper end section in communication with the surrounding atmosphere, a liquid de-entraining, air-permeable section defining a lower peripheral wall portion of said enclosure and comprising a uniform continuation of said upper end section, spray means disposed in said upper end section for spraying liquids in the direction of said air-permeable section, said liquids being broken into fine particles in the normal spraying operation, said spray means action inducing air to enter said enclosure upper end section, flow downwardly into said enclosure and out said air-permeable section, the distance between said spray means and said air-permeable section being sufficient to enable said liquid particles to partially evaporate because of contact with said air induced to enter said enclosure whereby the temperature thereof is lowered, basin means defining a lower end portion of said enclosure wherein cooled liquid particles may collect, and conduit means in communication with the enclosure exterior disposed in said basin means, such fluids to be cooled flowing through said conduit means in the normal course of operation.

4. The combination as recited in claim 3, in which a second fluid conduit having pump means interposed therein connects said basin means with said spray means whereby the sprayed fluids may be continuously recycled.

5. The cooling combination as recited in claim 1 in which said spray means are disposed substantially normal to said basin means and the included angle of the liquid sprays emerging from said spray means is between about 40–50 degrees.

6. The cooling combination as recited in claim 1 in which said spray means are disposed substantially normal to said basin means and the included angle of the liquid sprays emerging from said spray means does not exceed about 75 degrees.

References Cited in the file of this patent

UNITED STATES PATENTS

| | | |
|---|---|---|
| 852,543 | Deckebach | May 7, 1907 |
| 1,732,963 | Burhorn | Oct. 22, 1929 |
| 1,861,158 | Hilger | May 31, 1932 |
| 1,949,522 | Williams | Mar. 6, 1934 |
| 1,986,653 | Wade | Jan. 1, 1935 |
| 2,012,910 | Hubbs | Aug. 27, 1935 |
| 2,022,740 | Rowell | Dec. 3, 1935 |
| 2,088,962 | Kleuckler | Aug. 3, 1937 |